US011431943B2

(12) United States Patent
Ansley

(10) Patent No.: US 11,431,943 B2
(45) Date of Patent: Aug. 30, 2022

(54) SYSTEM AND METHOD FOR CAMERA AND BEACON INTEGRATION

(71) Applicant: Gregory Joseph Ansley, Johns Creek, GA (US)

(72) Inventor: Gregory Joseph Ansley, Johns Creek, GA (US)

(73) Assignee: Gregory J. Ansley, Johns Creek, GA (US)

( * ) Notice: Subject to any disclaimer, the term of this patent is extended or adjusted under 35 U.S.C. 154(b) by 46 days.

(21) Appl. No.: 16/996,435

(22) Filed: Aug. 18, 2020

(65) Prior Publication Data

US 2022/0060662 A1   Feb. 24, 2022

(51) Int. Cl.
| G01S 5/00 | (2006.01) |
| H04N 7/18 | (2006.01) |
| G01S 1/04 | (2006.01) |
| H04W 4/021 | (2018.01) |

(52) U.S. Cl.
CPC ............ *H04N 7/181* (2013.01); *G01S 1/045* (2013.01); *G01S 5/0027* (2013.01); *H04W 4/021* (2013.01)

(58) Field of Classification Search
CPC ....... H04N 7/181; G01S 1/045; G01S 5/0027; H04W 4/021
See application file for complete search history.

(56) References Cited

U.S. PATENT DOCUMENTS

| 2002/0145666 | A1* | 10/2002 | Seaman | G07C 5/085 348/148 |
| 2016/0134838 | A1* | 5/2016 | Tangeland | H04N 7/152 348/14.09 |
| 2017/0142323 | A1* | 5/2017 | Saito | H04N 5/23206 |
| 2017/0372574 | A1* | 12/2017 | Linsky | G08B 13/1966 |
| 2018/0054713 | A1* | 2/2018 | South | H04W 4/30 |

FOREIGN PATENT DOCUMENTS

| DE | 102008047727 A1 * | 3/2010 | G07C 5/008 |
| WO | WO-2009029980 A1 * | 3/2009 | G01S 11/16 |

* cited by examiner

*Primary Examiner* — Shadan E Haghani

(74) *Attorney, Agent, or Firm* — Carol Ansley

(57) ABSTRACT

A method and system are disclosed that provide integrated detection of spatially distributed events and monitoring of spatially distributed areas. Wireless beacon detection and event reporting by a mobile device are used to provide a management server with location information about events that may require video surveillance. The management server determines if any cameras are appropriate to monitor that location, and directs a camera management server to initiate video surveillance.

2 Claims, 10 Drawing Sheets

SYSTEM AND METHOD FOR CAMERA AND BEACON INTEGRATION

BACKGROUND

Closed circuit cameras are well known, allowing a business, for example, to monitor many spaces in a building or areas around a campus. The technology of such cameras has become primarily digital with systems often using a single Ethernet cable to provide power to the camera as well as to provide a data connection. The data connection can stream video from the camera to a server, and allow the server to send commands to the camera. Cameras that include motorized assemblies may allow remote control of features like pan, tilt, and zoom to be triggered by server commands.

Cameras typically stream the video they capture back to a server that can record the incoming data to a short term buffer, which might hold a few seconds or minutes of image data, or the server can store the image data in a long term storage device such as an SSD device or a hard disk drive. A video stream is understood by those skilled in the art to be made up of a series of images or the data to reconstruct those images. The frame rate and resolution of the images in the video stream from a camera may be adjusted in response to other events. Cameras may also incorporate motion detection processing capability and may alert a camera server when motion is detected.

Given the large amounts of data that may be flowing into a central server from multiple cameras, the server will generally only direct a video stream into long term storage if there is a reason. Most of the image data is buffered for a short time, then discarded. A server may direct a particular camera's image data stream to long term storage if there is a reason that the image data may need to be reviewed at a later time. The server might have an algorithm that directs a camera's image data to long term storage, for example, when a user indicates that a data stream is significant.

Another technology that is common in commercial areas is the wireless beacon. Wireless beacon devices use a variety of protocols to transmit signals announcing their presence. For example, iBeacon is a protocol developed by Apple as a variation of the Bluetooth Low Energy protocol. A compatible receiver device can receive the transmitted signal that generally includes an identifier for that beacon and may include other information. A receiver device can extract the wireless beacon identifier and may also be able to estimate the distance of the wireless beacon from the device by considering the received signal strength. Mobile devices such as smart phones or Land Mobile Radio (LMR) devices may contain wireless beacon receivers.

LMR devices are well known as utilizing licensed radio spectrum outside of the cellular bands used by smart phones. An LMR subscriber device may also be known as a mobile or handheld radio by those skilled in the art. A smartphone or LMR device may be managed or tracked by a central system, but that system is not typically connected or coordinated with cameras or video surveillance systems. A camera alert, such as that from motion detection, may be sent to one or more mobile devices by a camera server, but those devices may or may not be near the camera that sent the alert.

These technologies generally do not operate in concert. If an event is detected by a person carrying a mobile device, currently they may have to call or page another person monitoring the camera feeds. Time may be lost before a camera can be identified to allow the event to be recorded. In cases where there is no human involvement, either video images are not captured, or a large amount of video must be stored and manually screened. A need exists for a system that can correlate a roaming device with cameras close enough to the device for their image data to be relevant.

BRIEF SUMMARY OF INVENTION

Systems and methods are disclosed for providing integrated detection of spatially distributed events and monitoring of spatially distributed areas.

The method includes detecting one or more wireless beacons by a mobile device as well as detecting one or more events by the same mobile device, reporting at least the detected event by the mobile device to a management server, reporting at least one detected beacon by the mobile device to a management server and determining by the management server that one or more cameras are available to provide image data streams corresponding to the location of the event by correlating the detected one or more wireless beacons with one or more cameras.

A management server utilizes one or more network interfaces to communicate with roaming mobile devices. If a mobile device reports an event and associated wireless beacons nearby, the server determines if any cameras are available to provide live video of that area. The video may be directed to long term storage to allow it to be examined at a later time. The server may also notify a user through a user interface when notification of an event is received from a mobile device.

It will be appreciated that this brief summary describes only some of the concepts of the invention disclosed in more detail in the following detailed description of the invention. The claimed metes and bounds of the invention are not limited to the contents of this summary.

BRIEF DESCRIPTION OF DRAWINGS

Like numbers in drawings indicate discussion of the same object.

DETAILED DESCRIPTION OF INVENTION

Figure 1:
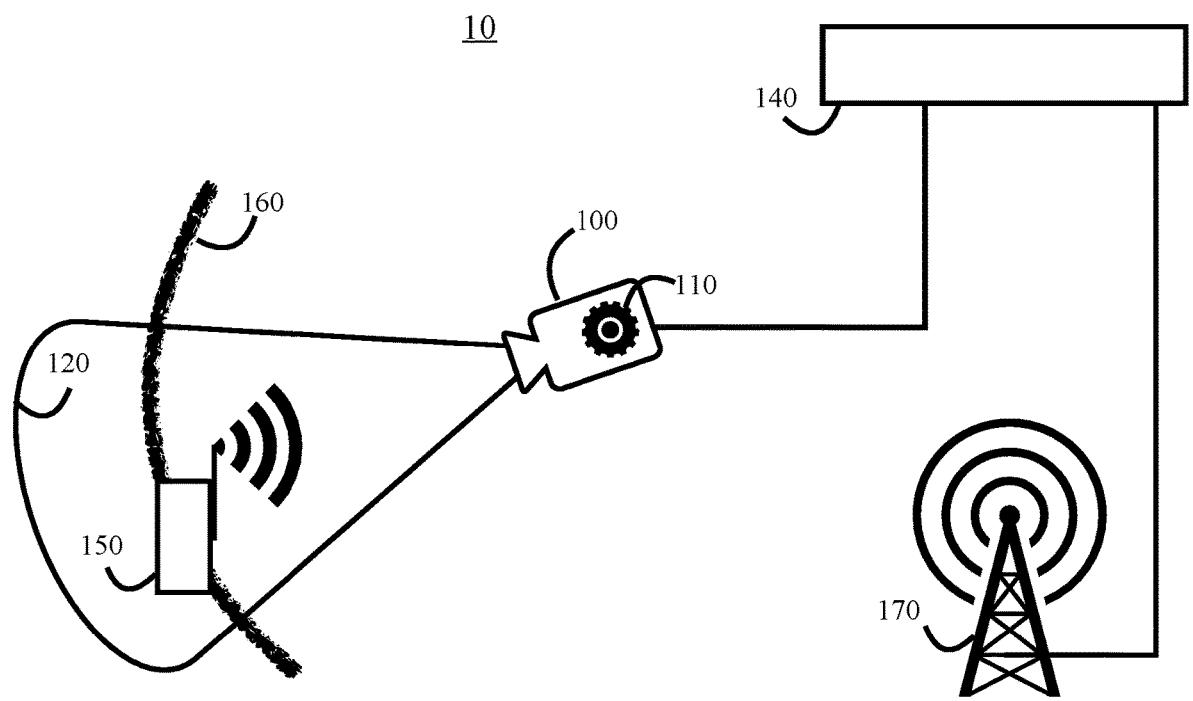
FIG. 1 illustrates an example deployment with a single wireless beacon and camera.

Illustrated in FIG. 1 is a deployment 10 of a camera 100 with a collocated wireless beacon 110. Camera 100 is connected to management server complex 140. In embodiments, the connection of camera 100 to management server complex 140 may be wireless or wired or a combination of wired and wireless technologies. Management server complex 140 is configured with information associating wireless beacon 110 with camera 100. Camera 100 surveys an area shown as area 120. Camera 100 may stream image data depicting area 120 to management server complex 140. Camera 100 may continuously stream image data to server complex 140, or it may only stream image data when an event is detected, such as a trigger from a motion detection circuit, or it may only stream image data when directed by server complex 140. The frame rate and resolution of the images from camera 100 may be adjusted by management server complex 140 in response to events.

Mobile device 150 is transiting area 120 along path 160, possibly carried by a person, such as a security guard, or possibly attached to a mobile unit, such as a warehouse robot. Device 150 may be a smartphone or an LMR device. Device 150 communicates with management server complex 140 using a wireless network connection through radio system 170 which is in turn communicatively connected with server complex 140. In embodiments, the wireless portion of the connection may include a cellular data network, an LMR network, or a wireless local area network, such as a Wi-Fi network or a CBRS network. The connection of radio system 170 to management server 140 may be wired or wireless or a combination of wireless and wired technologies. When device 150 enters area 120, it detects wireless beacon 110. When it leaves area 120, it no longer detects wireless beacon 110. Device 150 stores the identification and signal strength of the wireless beacons currently detected. In embodiments, device 150 may discard information about a wireless beacon when its signal strength falls below a threshold, or device 150 may save information relating to a number of the last known wireless beacons and only discard them when they are displaced by new wireless beacons in a circular buffer, as is well known in the art. Alternatively, device 150 may only determine which wireless beacons are present after an event notification is received or upon direction by management server 140; event notifications are discussed in the next paragraph.

Device 150 has the ability to receive event notifications. In embodiments, device 150 may have a button or switch that allows a user carrying device 150 to notify the device of an event. In other embodiments, device 150 may have sensors or be connected to sensors that notify device 150 of an event. For example, device 150 may be connected to a robot with a sensor configured to detect obstacles in its path. Alternatively or in addition, device 150 may have a drop sensor that detects if device 150 is dropped. When device 150 receives an event notification, it in turn sends one or more messages to management server complex 140 through radio system 170. In embodiments, one or more of the messages may contain identification information related to device 150, information about the event detected, as well as information about any wireless beacons detected. In other embodiments, device 150 may only send identification information related to device 150 and the event detected.

In the FIG. 1 example, if device 150 detected an event, it would communicate at least that an event had been detected along with its own identification to management server complex 140. In embodiments, device 150 may also include wireless beacon 110's information in massages through radio system 170 to management server complex 140. In other embodiments, device 150 may only send wireless beacon 110's information to management server complex 140 in response to a message from management server complex 140. Wireless beacon 110's information includes at least the identification information for beacon 110 and may also include the wireless signal strength determined by device 150.

Figure 2:
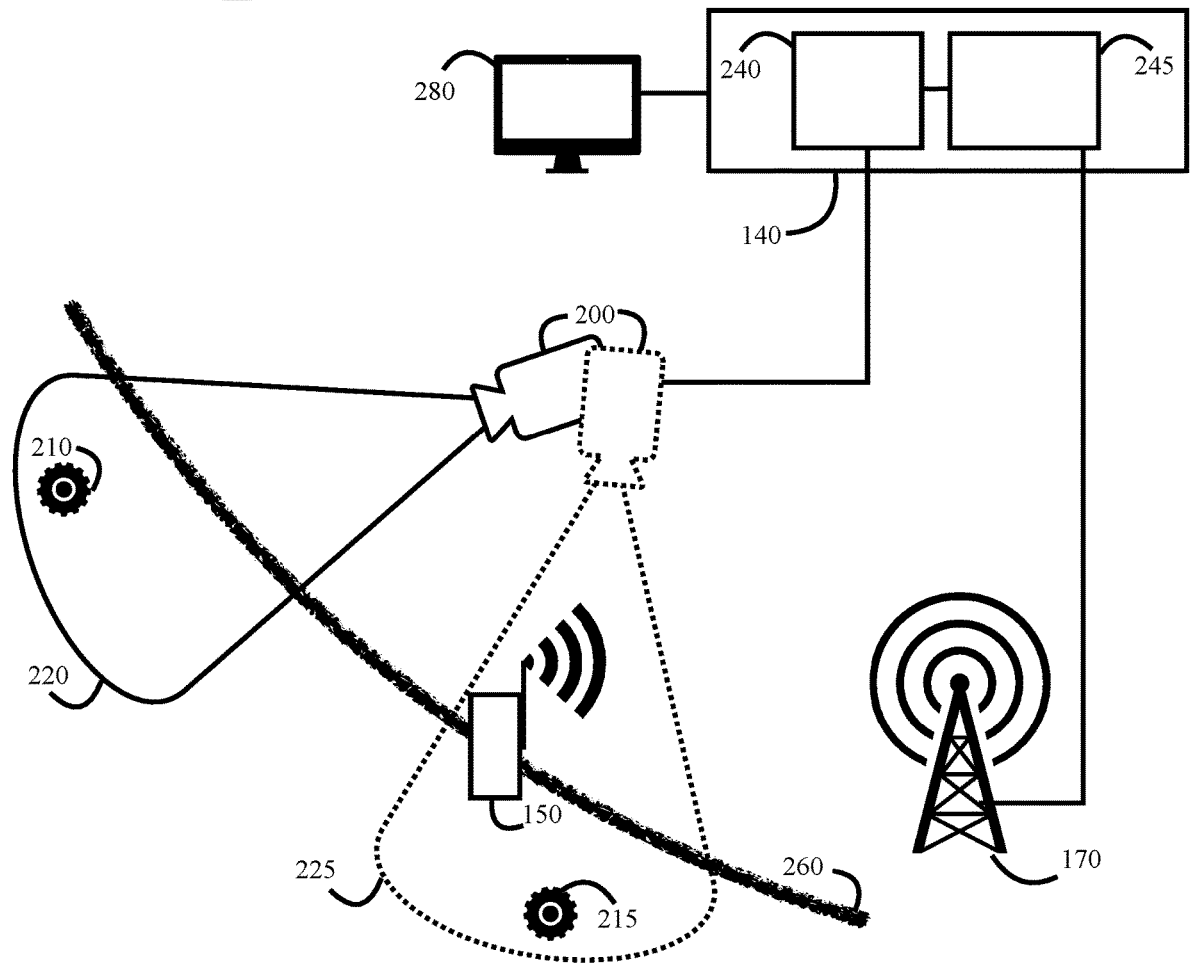
FIG. 2 illustrates another example deployment with two wireless beacons and a camera with multiple preset positions.

Illustrated in FIG. 2 is a more complex deployment 20. Camera 200 may survey at least two areas, area 220 and area 225 using a motorized assembly. Camera 200 is shown surveying area 220 in solid lines and surveying area 225 in dashed lines. Server complex 140 directs camera 200 to survey area 220 or area 225 using camera presets. Server complex 140 also may utilize pan, tilt and/or zoom settings of the camera to surveil a continuous set of positions between area 220 and area 225. Wireless beacon 210 is located in area 220 and wireless beacon 215 is located in area 225.

A more detailed illustration of the management server complex 140 is provided in FIG. 2. In embodiments, management server complex 140 includes a camera management server 240 and a radio management server 245. Camera management server 240 manages the video streams from the cameras as well as managing the cameras themselves. Radio management server 245 manages the interface to the mobile devices. Server 240 and server 245 communicate to exchange information. A user interface 280 is provided for management server complex 140. In embodiments, user interface 280 may be provided by a separate computer or device that logs into an application in one of the servers within server complex 140. Alternatively, one of the servers 240 and 245 may be directly connected to user interface 280. Server 240 as well as server 245 may provide information used by user interface 280. At least one server within management server complex 140 is configured with information linking camera 200 and a first preset with wireless beacon 210. Similarly, at least one server within server complex 140 is configured with information linking camera 200 and a second preset with wireless beacon 215. Server complex 140 may further be configured with information linking the locations of wireless beacon 210 and 215 with the path of camera 200 as it pans from area 220 to area 225. In embodiments, server 245 may contain the databases linking wireless beacons 210 and 215 with areas 220 and 225, as well as camera 200.

Device 150 is transiting areas 220 and 225 along path 260. When device 150 enters area 220 it detects wireless beacon 210 and wireless beacon 215, but wireless beacon 210 has a higher signal strength than wireless beacon 215 when device 150 is in area 220. If device 150 crosses to area 225, then wireless beacon 215 will have a higher signal strength than wireless beacon 210. If device 150 were to detect an event while in area 225 as shown in FIG. 2, device 150 may send one or more messages with its device identification information and any event information to server 245 within server complex 140 using wireless network 170. In embodiments, device 150 may also send information about one or more wireless beacons detected, such as wireless beacons 215 and 210 as well as the signal strengths of the two wireless beacons either with the initial event report or in response to a query from server 245. In other embodiments, device 150 may send information about the relative signal strengths of the detected wireless beacons instead of the absolute signal strengths.

Management server complex 140 uses the information received from device 150 to determine which camera or cameras are appropriate to view the area where device 150 has reported an alert. In embodiments, server 245 may compare the relative strengths of the beacons reported by mobile device 150 to determine which camera or cameras are relevant to access for their video feeds. In embodiments, after determining which camera or cameras are relevant to surveil the event reported by device 150, server 245 may direct server 240 to use camera 200 in its second preset to surveil area 225 based on the wireless beacon information reported by device 150. In other embodiments, server 245 may direct server 240 to pan, tilt or zoom camera 200 to surveil an area between preset one and preset two proportional to the relative signal strengths of wireless beacons 210 and 215. For instance, server 245 may have precomputed or measured maps for each beacon's signal strength. By comparing the reported signal strengths of beacons 210 and 215 with those maps, server 245 may determine the most likely position of mobile device 150 and the camera or cameras most likely to provide relevant image data based on that position. Alternatively, server 245 may compute a likely position for device 150 based on calculations using the absolute or relative signal strengths of beacons 210 and 215 reported by device 150.

Figure 3:
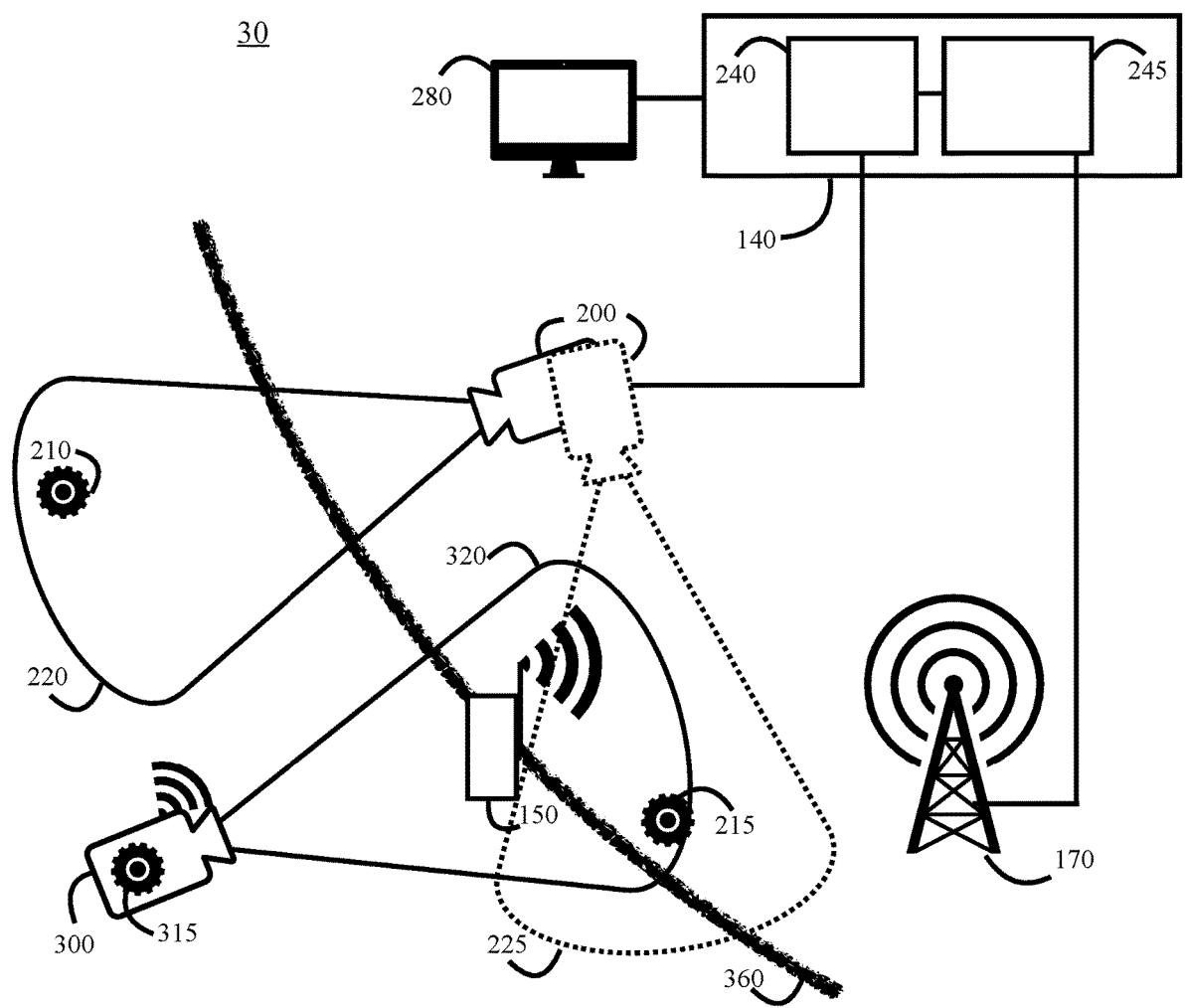
FIG. 3 illustrates a third example deployment with two wireless beacons and two cameras.

Illustrated in FIG. 3 is an exemplary multi-camera deployment 30. As in deployment 20, camera 200 may surveil at least two areas, area 220 and area 225 using a motorized assembly. Server complex 140 directs camera 200 to survey area 220 or area 225 using camera presets. Server complex 140 may also utilize pan, tilt and/or zoom settings of the camera to surveil a continuous set of positions between area 220 and area 225. Wireless beacon 210 is located in area 220 and wireless beacon 215 is located in area 225. An additional camera 300 surveils an area 320 and has a collocated wireless beacon 315.

As in deployment 20, management server complex 140 includes a camera management server 240 and a radio management server 245. Camera management server 240 manages the video streams from at least camera 200 and camera 300 as well as managing the cameras themselves. Radio management server 245 manages the interface to the mobile devices. Server 240 and server 245 communicate to exchange information. A user interface 280 is provided for management server complex 140. In embodiments, user interface 280 may be provided by a separate computer or device that logs into an application in one of the servers within server complex 140. At least one server within management server complex 140 is configured with information linking camera 200 and a first preset with wireless beacon 210. Similarly, at least one server within server complex 140 is further configured with information linking camera 200 and a second preset with wireless beacon 215 as well as information linking camera 300 with wireless beacon 315. Server complex 140 may further be configured with information linking the locations of wireless beacons 210, 215 and 315 with the path of camera 200 as it pans from area 220 to area 225 as well as information linking the locations of wireless beacons 315 and 215 with camera 300. In embodiments server 245 may contain the databases linking wireless beacons 210, 215 and 315 with areas 220, 225 and 320 respectively, as well as cameras 200 and 300.

Device 150 is transiting areas 220, 225 and 320 along path 360. When device 150 enters area 220 it detects wireless beacons 315, 210 and 215, but wireless beacon 210 has a higher signal strength than wireless beacon 215 and wireless beacon 315. If device 150 crosses to area 320, then wireless beacon 210 will have a lower signal strength than wireless beacons 215 and 315. If device 150 were to detect an event while in area 320 as shown in FIG. 2, device 150 may send one or more messages with its device identification information and event information to server 245 within server complex 140 using wireless network 170. In embodiments, information about wireless beacon 215 may also be included since wireless beacon 215 would have the highest signal strength or device 150 may wait for a message from server 245 directing it to send beacon information. In embodiments, device 150 may also send information about wireless beacon 315 and wireless beacon 210 as well as the signal strengths of the three wireless beacons either in concert with the original event notification message or in response to a query from server 245. In other embodiments, device 150 may similarly send information about the relative signal strengths of the detected wireless beacons instead of the absolute signal strengths.

Management server complex 140 uses the information received from device 150 to determine which camera or cameras are appropriate to view the area where device 150 has reported an alert. In embodiments, server 245 may query device 150 for wireless beacon information if it was not included in the original messages. Server 245 may compare the relative strengths of the beacons reported by mobile device 150 to determine which camera or cameras are relevant to access for their video feeds. In embodiments, after determining which camera or cameras are relevant to surveil the event reported by device 150, server 245 may direct server 240 to use camera 300 based on the wireless beacon information reported by device 150. In other embodiments, server 245 may alternatively or in addition direct server 240 to pan, tilt or zoom camera 200 to surveil an area between preset one and preset two proportional to the relative signal strengths of wireless beacons 210, 215 and 315. For instance, server 245 may have precomputed or measured maps for each beacon's signal strength. By comparing the reported signal strengths of beacons 210, 215 and 315 with those maps, server 245 may determine the most likely position of mobile device 150 and the camera or cameras most likely to provide relevant image data based on that position.

Figure 4:
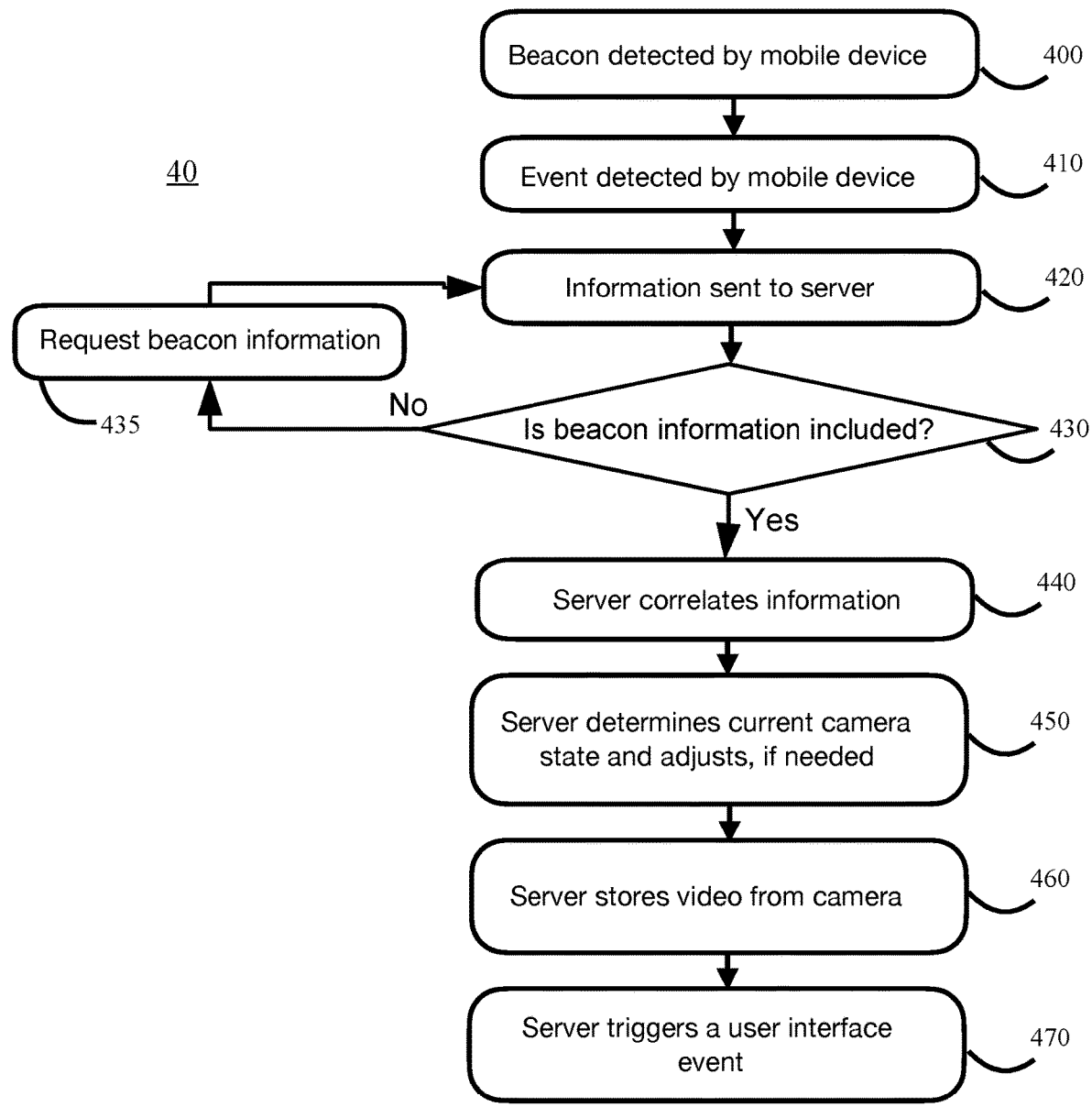
FIG. 4 illustrates a flow diagram relating to FIG. 1.

Illustrated in FIG. 4 is a flow diagram 40 as demonstrated by reference to the elements of FIG. 1. In step 400, device 150 enters area 120 and detects wireless beacon 110. Device 150 stores an indication in its local memory that it has detected wireless beacon 110.

As device 150 is transiting area 120, an event is detected by the device at step 410. In embodiments, the event may be the user carrying device 150 pressing a button to indicate an alert. In other embodiments, the event may be detection of a contact closure on device 150 triggered by a sensor in a warehouse robot detecting that an object is blocking the robot's path. A person of skill in the art would understand that many different technologies would be available to notify device 150 of an event. For instance, the 'button' used by the user might be a physical button on a mobile radio, or it may be an icon or virtual button on a smartphone's screen.

At step 420, device 150 sends information about the event to management server complex 140. The information sent also includes explicit or implicit identification of device 150 as the originator of the event. In embodiments, the information may be contained in one or more messages. The messages may be sent once or the messages may be sent repeatedly until management server complex 140 responds.

At step 430, management server complex 140 receives one or more messages from device 150 with at least information about the event and device 150. Server complex 140 determines if beacon information is included in the one or more messages. If beacon information is not included, the process moves to step 435. If beacon information is included in the messages, then the process continues to step 440.

At step 435, server complex 140 sends one or more messages to the mobile device that reported the event, device 150 in this case, directing the device to respond with information about any wireless beacons currently detected. The process then returns to step 420.

At step 440, server complex 140 uses the received information including device 150's identification, event information and wireless beacon information to determine one or more camera to associate with the event. For example, server complex 140 may associate wireless beacon 110 with camera 100 using preconfigured information.

At step 450, server complex 140 determines the current state of camera 100. If camera 100 is not currently streaming image data, then server complex 140 instructs camera 100 to begin streaming data to server complex 140.

At step 460, server complex 140 directs image data from camera 100 into long term storage. In embodiments, if camera 100 had already been streaming image data into a temporary buffer, server complex 140 may also direct the current contents of the temporary buffer into long term storage to provide additional image data from a period of time immediately before the event was triggered. For instance, if camera 100 was sending image data into a 3 minute circular buffer, the server complex could prepend the 3 minutes of image data in the buffer to the file created after the camera was identified in step 440.

At Step 470, server complex 140 also triggers a user interface event to notify any people or automated systems monitoring deployment 10. For example, server complex 140 could place a banner on a user interface screen with information about the event including which mobile device triggered the event and in which area the mobile device was when triggering the event. Other user interface events could include text messages to other mobile devices not involved in the event.

While the steps of this method have been presented in a certain order, a person of skill in the art would understand that other orders are possible for the steps to accomplish the same results and those alternate orders are also understood as comprising this invention. For instance, server 140 could trigger a user interface event as soon as the information is received from the mobile device in step 430 or after the camera state is determined in step 450.

Figure 5:
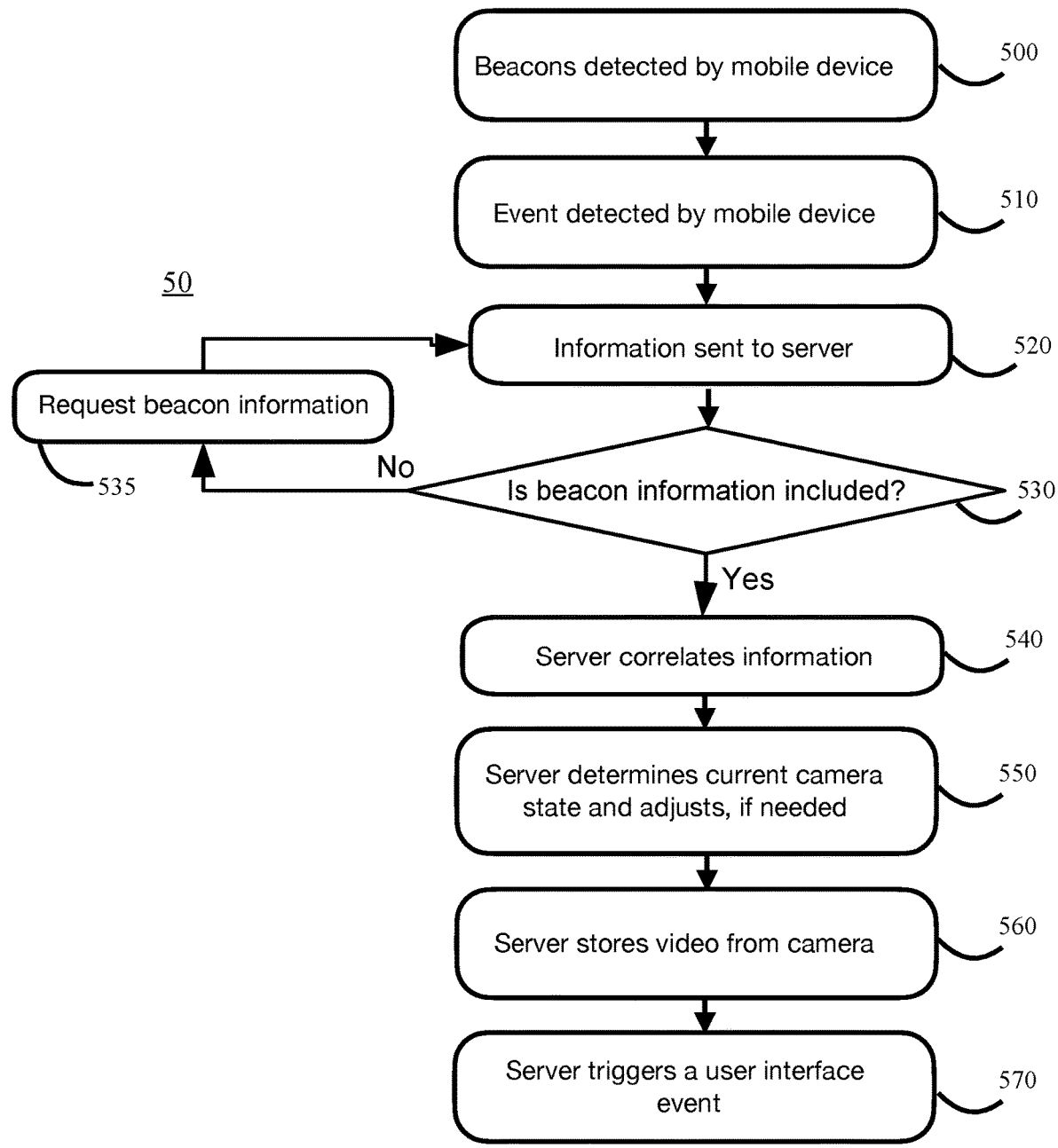
FIG. 5 illustrates a flow diagram relating to FIG. 2 and FIG. 3.

Turning to FIG. 5, a flow diagram 50 is presented demonstrating events in an embodiment associated with FIG. 2 and an embodiment associated with FIG. 3.

Considering FIG. 2, in step 500, device 150 begins following path 260 and detects wireless beacon 210 at a first signal strength and wireless beacon 215 at a second lower signal strength. Device 150 may store an indication in its local memory that it has detected wireless beacon 210 at a first signal strength and wireless beacon 215 at a second signal strength. As device 150 continues along path 260, device 150 may continually update the received signal strengths of beacon 210 and 215 as the respective signal strengths change or it may periodically update the received signal strengths.

As device 150 is transiting area 225, an event is detected by the device at step 510. In embodiments, the event may be generated by the user carrying device 150 pressing a button to indicate an alert. In other embodiments, the event may be device 150 detecting a contact closure initiated by a sensor in a warehouse robot detecting that an object is blocking the robot's path. A person of skill in the art would understand that many different technologies would be available to notify device 150 of an event.

At step 520, device 150 sends at least self-identifying information and information about the event detected to RF management server 245. In embodiments, device 150 may also include information about all beacons detected with signal strength above a certain threshold and the signal strengths of those wireless beacons or just information about the strongest beacon signal detected. Alternatively, device 150 may include information about the relative signal strengths of all wireless beacons detected. In embodiments, the information may be contained in one or more messages. The messages may be sent once or the messages may be sent repeatedly until radio management server 245 responds.

At step 530, radio management server 245 receives one or more messages from device 150 with at least information about device 150 and the event. Radio management server 245 determines if beacon information is included in the one or more messages. If beacon information is not included, the process moves to step 535. If beacon information is included in the messages, then the process continues to step 540.

At step 535, radio management server 245 sends one or more messages to the mobile device that reported the event, device 150 in this case, directing the device to respond with information about any wireless beacons currently detected. The process then returns to step 520.

At step 540, radio management server 245 correlates the beacon information received with camera information. In embodiments, radio server 245 may associate the reception of wireless beacon 215 at a certain level with camera 200 and a certain preset using preconfigured information. In another embodiment, radio server 245 may determine the direction and focus or depth of field changes camera 200 should make using pan, tilt or zoom capabilities to based on the relative signal strengths of beacons 210 and 215 and preconfigured information about their respective signal strengths by location.

At step 550, radio server 245 requests camera management server 240 to determine the current state of camera 200. The state of camera 200 may include its current streaming status and its current view angle or preset position. In embodiments, if camera 200 is not currently streaming image data, then server 240 reports that state as well as the camera's current view angle to server 245. Server 245 then instructs server 240 to direct camera 200 to shift to its second preset position, if it was not there already, and begin streaming data. In other embodiments, server 240 may direct camera 200 to begin streaming video when server 245 asks for status. If camera 200 is not currently in the second preset position surveying area 225, server 240 directs camera 200 to transition to its second preset position surveying area 225.

In another embodiment, server 245 may send a message instructing server 240 to direct camera 200 to a desired view angle or preset and to begin streaming image data without first determining the state of the camera. If server 240 determines that camera 200 is already in the correct position and streaming image data, server 240 may not communicate with camera 200.

At step 560, server 240 directs image data from camera 200 into long term storage. In embodiments, if camera 200 had already been streaming image data from area 225 into a temporary buffer, server 140 may also direct the current contents of the buffer into long term storage to provide additional image data from a period of time immediately before the event was triggered. For instance, if camera 200 was already in its second preset position and sending image data into a 3 minute circular buffer, the server could append the 3 minutes of image data in the buffer to the file created after the message was received in step 540. If camera 200 was in the first preset position immediately before the event was triggered, server 240 might discard the image data in the short-term circular buffer.

At Step 570, server 245 also triggers a user interface event to notify any people monitoring the system. For example, server 245 could place a banner on user interface screen 280 with information about the event including which mobile device triggered the event and in which area the mobile device was when triggering the event. Other user interface events could include text messages to other mobile devices not involved in the event.

While the steps of this method have been presented in a certain order, a person of skill in the art would understand that other orders are possible for the steps to accomplish the same results and those alternate orders are also understood as part of this invention. For instance, server 140 could trigger a user interface event as soon as the information is received from the mobile device in step 530 or after the camera state is determined in step 540.

Considering the deployment illustrated in FIG. 3, the steps of FIG. 5 may include additional activity as an embodiment.

In step 500, mobile device 150 may detect up to 3 wireless beacons as it proceeds along path 360. In embodiments, device 150 may store in local memory only the beacon with the highest signal but may preferentially store information about all detected beacons and their respective signal levels. As device 150 continues along path 360, device 150 may continually update the received signal strengths of wireless beacons as the respective signal strengths change or it may periodically update the received signal strengths. Beacons whose signal strength falls below a threshold may be deleted from local memory and new beacons may be added as their signal strength rises above a threshold.

As device 150 is transiting area 320, an event is detected by the device at step 510. In embodiments, the event may be the user carrying device 150 pressing a button to indicate an alert. In other embodiments, the event may be device 150 detecting a contact closure initiated by a sensor in a warehouse robot detecting that an object is blocking the robot's path. A person of skill in the art would understand that many different technologies would be available to notify device 150 of an event.

At step 520, device 150 sends at least self-identifying information and information about the event detected to RF management server 245. In embodiments, device 150 may also include information about all beacons detected with signal strength above a certain threshold and the signal strengths of those wireless beacons or just information about the strongest beacon detected. Alternatively, device 150 may include information about the relative signal strengths of all wireless beacons detected. In embodiments, the information may be contained in one or more messages. The messages may be sent once or the messages may be sent repeatedly until radio management server 245 responds.

At step 530, radio management server 245 receives one or more messages from device 150 with at least information about device 150 and the event. Radio management server 245 determines if beacon information is included in the one or more messages. If beacon information is not included, the process moves to step 535. If beacon information is included in the messages, then the process continues to step 540.

At step 535, radio management server 245 sends one or more messages to the mobile device that reported the event, device 150 in this case, directing the device to respond with information about any wireless beacons currently detected. The process then returns to step 520.

At step 540, radio management server 245 correlates in information received about beacons associated with device 150's current position and stored camera information. In embodiments, radio server 245 may associate the reception of wireless beacon 215 at a certain level with camera 200 and a certain preset using preconfigured information. RF server 245 may also associate camera 300 with the reception of beacon 215 at a certain level. In further embodiments, radio server 245 may determine the direction and focus or depth of field changes camera 200 should make using pan, tilt or zoom capabilities to based on the relative signal strengths of beacons 210, 215, and 315 and preconfigured information about their respective signal strengths by location. Radio server 245 may consider the combination of received signal strengths from beacons 210, 215 and 315 to determine which camera or cameras are appropriate to activate in response to the event report from device 150. Cameras 200 and 300 may possess different capabilities or different network connections that may comprise part of the considerations of which camera or cameras should be used to surveil device 150. For example, camera 200 may have a fixed focal length, while camera 300 may have improved zoom capabilities. In other considerations, camera 300 might have a limited network bandwidth for its image data stream leading to lower resolution images, due to it having a wireless connection to server 240, while camera 200 might have a higher bandwidth wired connection allowing it to provide images with improved resolution and/or frame rate.

At step 550, radio server 245 requests camera management server 240 to determine the current state of cameras 200 and 300. The state of a camera may include its current streaming status and its current view angle or preset position. In embodiments, if camera 200 is not currently streaming image data, then server 240 reports that state as well as the camera's current view angle to server 245. Server 245 then instructs server 240 to direct camera 200 to shift to a position using pan, tilt and/or zoom as determined by the relative signal strengths of beacons 210, 215 and 315 as reported by device 150, and begin streaming data. In other embodiments, server 240 may determine that camera 300 is already streaming image data into a circular buffer. Server 240 may report that status to server 245.

In another embodiment, server 245 may send a message instructing server 240 to instruct camera 200 with a desired view angle or preset and to begin streaming image data without first determining the state of the camera. If server 240 determines that camera 200 is already in the correct position and streaming image data, server 240 may not communicate with camera 200.

At step 560, server 240 directs image data from camera 200 and camera 300 into long term storage. In embodiments, if camera 300 had already been streaming image data from area 320 into a temporary buffer, server 140 may also direct the current contents of the buffer into long term storage to provide additional image data from a period of time immediately before the event was triggered. For instance, if camera 300 was already sending image data into a 3 minute circular buffer, the server could append the 3 minutes of image data in the buffer to the file created after the message was received in step 530.

At Step 570, server 245 also triggers a user interface event to notify any people or systems monitoring deployment 30. For example, server 245 could place a banner on user interface screen 280 with information about the event including which mobile device triggered the event and in which area the mobile device was when triggering the event. Other user interface events could include text messages to other mobile devices not involved in the event.

Figure 6:
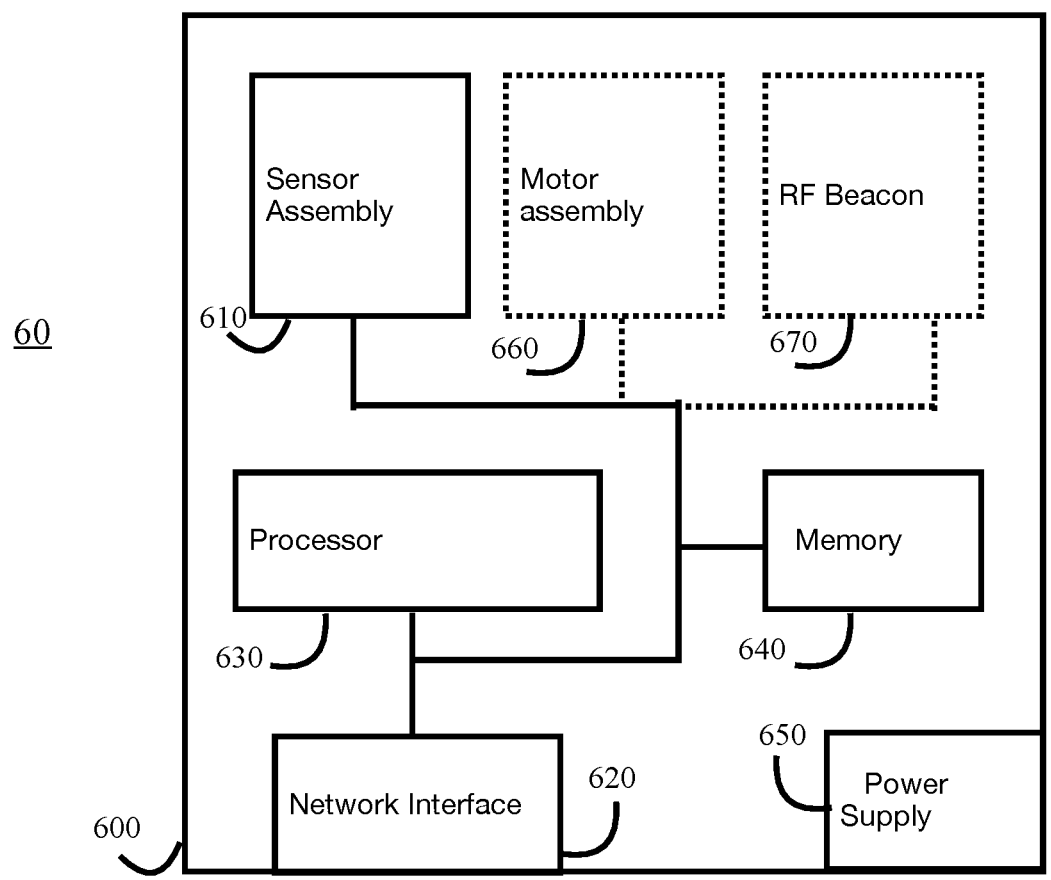
FIG. 6 illustrates an example block diagram of a networked camera.

In FIG. 6, block diagram 60 of an exemplary camera 600 is shown. Cameras such as camera 600 are well known in the art. Camera 600 includes a sensor assembly 610, a network interface 620, a processor 630, a memory 640, and a power supply 650. Camera 200 may also include a motor assembly 660 and a wireless beacon 670. The dashed lines for these subassemblies indicate that they are not required to be present in a camera for it to embody the concepts disclosed in this specification.

Sensor assembly 610 includes an image sensor, such as a CCD array, and may also include a lens and an LED array. The lens may provide additional focusing capabilities to enhance the image on the image sensor. An LED array may provide illumination if there is not enough visible light or infrared light for the image sensor to function properly. The information output of sensor assembly 610 may be directed to memory 640 as well as network interface 620 under the control of processor 630.

Network interface 620 allows camera 600 to communicate with the local area network. Network interface 620 may be a wired interface, such as an ethernet interface or it may be a wireless interface such as a Wi-Fi interface. Those skilled in the art will recognize that many different network interfaces are possible to allow camera 600 to efficiently communicate with the local area network. Network interface 620 is connected to memory 640 as well as processor 630.

Processor 630 communicates over network interface 620 to at least a camera management server, such as camera management server 245 of deployment 20 (not shown). Processor 630 utilizes memory 640 for program storage as well for short-term storage of image data, if needed. Processor 630 is connected to sensor assembly 610, memory 640 and network interface 620. Processor 630 may also be connected to motor assembly 660 allowing processor 630 to direct its operation. Processor 630 may provide the ability to directly adjust image resolution and frame rate, or that capability may reside in sensor assembly 610. If the capability to adjust the frame rate and/or resolution resides in sensor assembly 610, then processor 630 may direct sensor assembly 610 to select a certain frame rate or resolution. Many different embedded processors are known in the art that would be sufficient to control camera 600.

Power supply 650 provides power for all of the active electronics in camera 600. The power may be sourced from the same connector as network interface 620 using Power Over Ethernet (POE) technology as is well known in the art. Alternatively, power may be sourced from AC line power or other local power connections as are well known in the art.

Motor assembly 660 may provide camera 600 with additional capabilities allowing camera 600 to pan its field of view, tilt camera 600's view angle, zoom camera 600's field of view as well as adjust camera 600's focus. Motor assembly 660 may be directed by processor 630 based on local information or processor 630 may direct the motion of motor assembly 660 based on information received over network interface 620, such as commands from management server complex 140.

Wireless beacon 670 may be integrated into camera 600. A detailed description of an exemplary wireless beacon is provided with FIG. 7.

Figure 7:
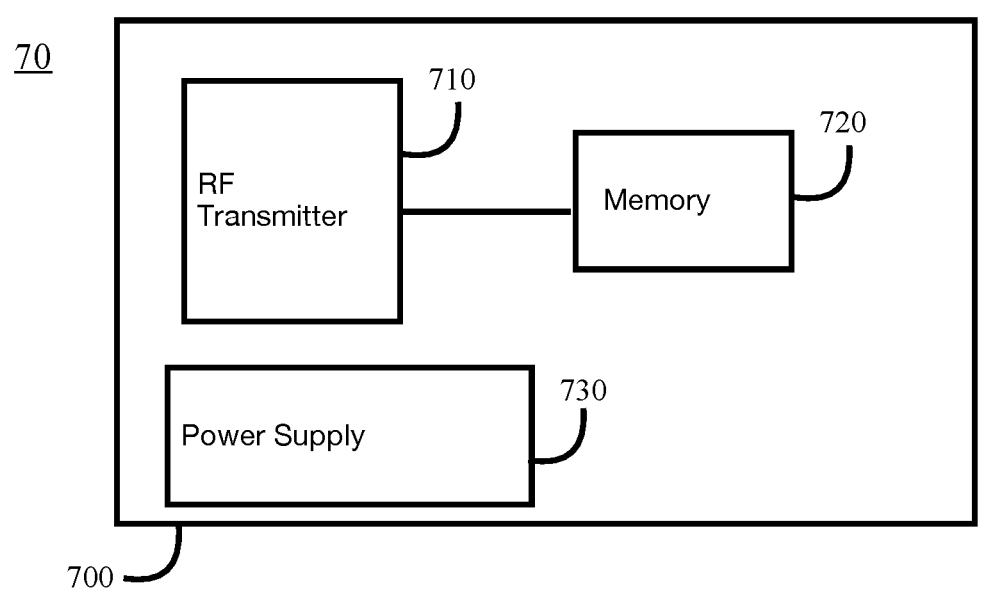
FIG. 7 illustrates an example block diagram of a wireless beacon.

FIG. 7 illustrates a block diagram 70 of an exemplary wireless beacon 700 including an RF transmitter 710, a memory 720, and a power supply 730. Wireless beacons as discussed earlier are well known in the art. Wireless beacons may stand alone, such as wireless beacon 700, or the circuitry may be integrated within a camera or other electronic device. RF transmitter 710 includes an antenna and circuitry sufficient to transmit information, typically at a low power to effectively set a limited area in which the transmitted signal may be received. RF transmitter 710 is connected to memory 720. Memory 720 stores identification information about beacon 700 and may provide information about the protocol used by RF transmitter 710. As is well known in the art, there are several popular wireless beacon protocols. This disclosure is not restricted to any specific protocol. Power Supply 730 supplies power for RF transmitter 710 and memory 720. The power may be supplied by batteries or power supply 730 may be connected into AC line power. If beacon 700 is integrated into another device, that device may supply power for the beacon circuitry.

Figure 8:
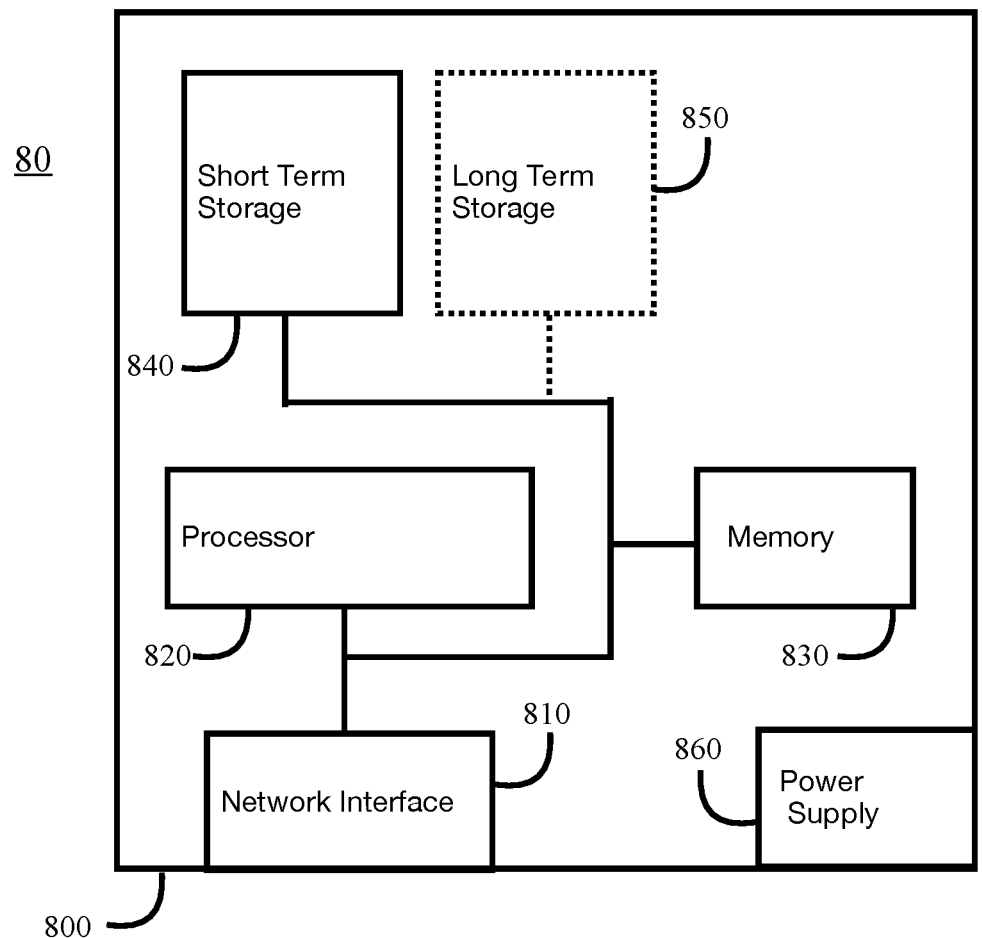
FIG. 8 illustrates an example block diagram of a camera management server.

FIG. 8 illustrates a block diagram 80 of an exemplary camera management server 800 including at least one network interface 810, a processor 820, a processor memory 830, a short-term memory 840 and a long term memory 850. Long term memory 850 may be located externally to the physical management server as is indicated by the dashed lines. Camera management server 800 also includes a power supply 860.

Network interface 810 is connected to processor 820 allowing camera management server 800 to communicate with the local area network which might include one or more cameras, a user interface, and a radio management server. Network interface 810 may comprise a wired interface, such as an ethernet interface and/or a wireless interface such as a Wi-Fi interface. Those skilled in the art will recognize that many different network interfaces are possible to allow server 800 to efficiently communicate with the local area network. Camera management server 800 may have more than one network interface 810 depending upon the local networking configuration. For example, server 800 might have one wireless network interface to communicate with a camera 300 having only a wireless network interface, and server 800 might also have a wired network interface to communicate with a second camera 200 having a PoE connection as its network interface. Processor 820 may use network interface 810 to communicate with cameras. Network interface 810 may be connected to memories 840 and 850 to allow efficient storage of incoming image data if memory 850 is internal to server 800. Network interface 810 may also allow processor 820 to provide a user interface remotely, not shown in the diagram.

Processor 820 may be a single core or multi-core microprocessor as are well known in the art. Processor 820 may utilize an operating system such as Windows, Linux or FreeBSD. One skilled in the art will know that many operating system choices are possible to provide the requisite functionality in processor 820. Processor 820 may utilize a processor working memory 830 for general operational needs, such as storage of operating instructions. Memory 830 may comprise any combination of RAM, DRAM, and FLASH memory devices. Processor 820 may also utilize a short term memory 840 configured to allow image data streams from one or more cameras to be stored in one or more respective circular buffers. The operation of a circular buffer is well known in the art to allow the retention of only a limited amount of data in a first in first out operation. Short term memory 840 may include any combination of storage devices appropriate to the task such as RAM, DRAM, hard disk drives or solid state device (SSD) drives. Processor 820 may also utilize long-term memory 850 to store image data streams of interest. Long term memory 850 may include any combination of storage devices appropriate to the task such as RAM, DRAM, hard disk drives or solid state device (SSD) drives. The interesting data streams may be stored until a user deletes them or there may be a fixed amount of time they will be retained.

While the short-term and long-term memories are shown as nominally integrated into server 800, one with skill in the art would understand that they may be physically located separately from server 800 and only integrated at a logical level so that processor 820 may still utilize them as if they were co-located within server 800.

Power supply 860 supplies power for all of the active electronics in management server 800 including the processor, memories, and network interfaces. Power supply 860 would typically contain a high power AC to DC power convertor to ensure efficient operation of the server and its associated memories.

Figure 9:
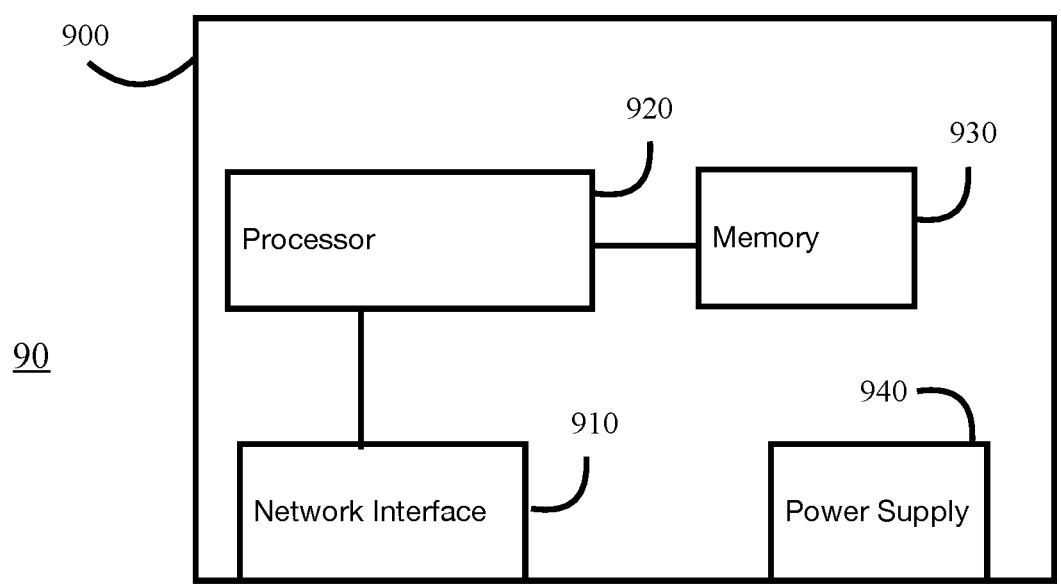
FIG. 9 illustrates an example block diagram of a radio management server.

FIG. 9 illustrates a block diagram 90 of an exemplary radio management server 900 including at least one network interface 910, a processor 920, a processor memory 930. Radio management server 900 also includes a power supply 940.

Network interface 910 is connected to processor 920 allowing radio management server 900 to communicate with other networks and devices which might include wide area networks, radio networks, an external user interface, and camera management server 800. Network interface 910 may comprise a wired interface, such as an ethernet interface or it may comprise a wireless interface such as a Wi-Fi interface. Network interface 910 may comprise more than one physical interface depending upon local network configuration. Those skilled in the art will recognize that many different network interfaces are possible to allow server 900 to efficiently communicate. Radio management server 900 may have more than one network interface 910 depending upon the local networking configuration. For example, server 900 might have one wireless network interface to communicate with a mobile device instantiation of a smart phone having only a wireless network interface, and server 900 might also have a wired network interface to communicate with a second mobile device instantiated as an LMR handheld radio having a WAN connection through a LMR repeater and other network infrastructure. Processor 920 may use network interface 910 to communicate with camera management server 800. Network interface 910 may also allow processor 920 to communicate with a remote user interface, not shown in the diagram.

Processor 920 may be a single core or multi-core microprocessor as are well known in the art. Processor 920 may utilize an operating system such as Windows, Linux or FreeBSD. One skilled in the art will know that many operating system choices are possible to provide the requisite functionality in processor 920. Processor 920 may utilize a processor working memory 930 for general operational needs, such as storage of operating instructions and tables or other information about wireless beacon location and signal strength. Memory 930 may comprise any combination of RAM, DRAM, and FLASH memory devices.

Power supply 940 supplies power for all of the active electronics in management server 900 including the processor, memories, and network interfaces. Power supply 940 would typically contain a high power AC to DC power convertor to ensure efficient operation of the server and its associated memories.

Figure 10:
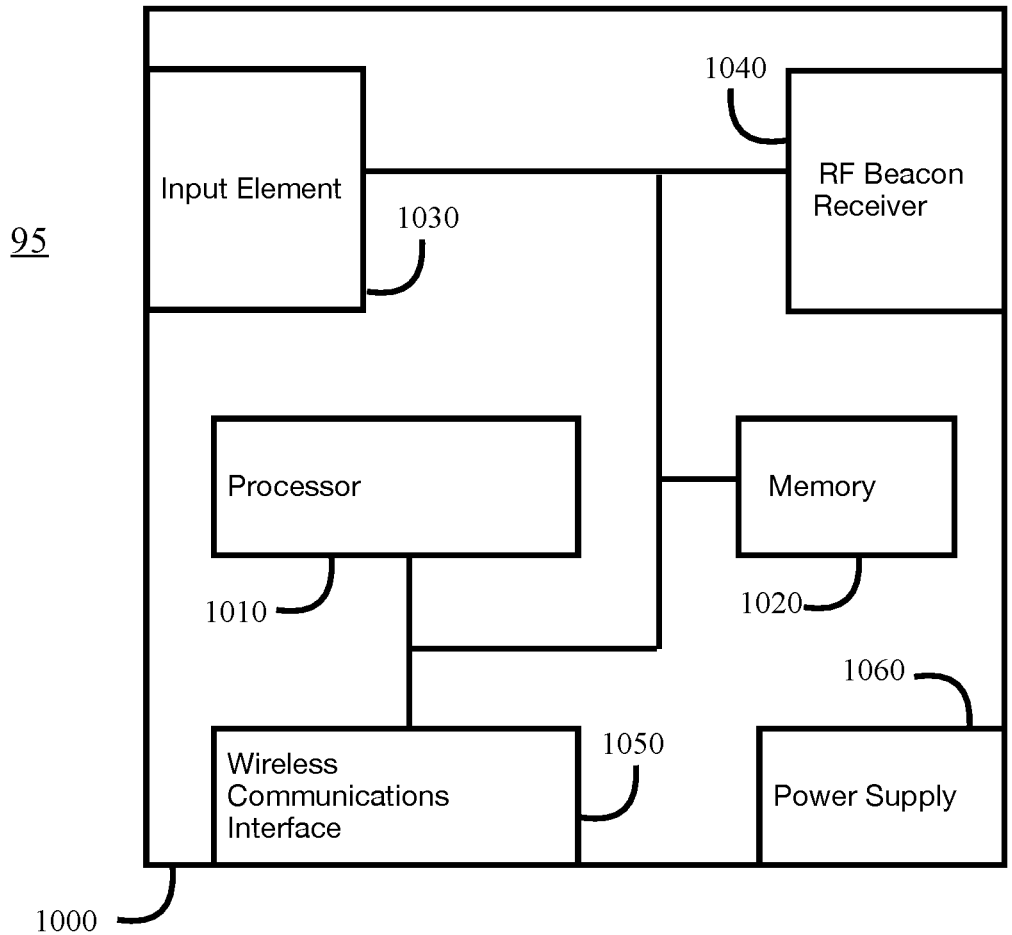
FIG. 10 illustrates an example block diagram of a mobile device.

FIG. 10 illustrates a block diagram 95 of an exemplary mobile device 1000 that may be used to initiate image storage actions. Mobile device 1000 contains a processor 1010, a memory 1020, an input device 1030, a wireless beacon receiver 1040 and a wireless communication interface 1050. Mobile device 1000 also includes a power supply 1060.

Processor 1010 is configured to manage the operation of mobile device 1000. Processor 1010 may be a small general purpose microprocessor or it may be a custom processor with functionality limited to that required by mobile device 1000. One skilled in the art would know that there are many processor choices available for such as device. Memory 1020 may be used by processor 1010 for storage of operating instructions as well as for short term storage of operational data, such as wireless beacon data. Processor 1010 is also connected to input device 1030, wireless beacon receiver 1040, and wireless communication interface 1050.

Input element 1030 may be a physical or logical button or similar element on mobile device 1000, if mobile device 1000 is configured to accept an event indication from a human user. In other embodiments, input element 1030 may be a circuit for detecting a contact closure or other circuitry configured to receive a signal from a sensor, if mobile device 1000 is configured to accept input from an automatic circuit. For example, a vision sensor may initiate a contact closure toward input 1030 when an obstacle in the path of a robot to which mobile device 1000 is affixed is detected. One with skill in the art would realize that many such sensors or circuits may be configured to detect event indications and provide that indication to processor 1010.

Wireless beacon receiver 1040 allows mobile device 1000 to receive information from wireless beacons when they are in range of receiver 1040. Wireless beacon receiver 1040 may be configured to directly provide that information to processor 1010. Wireless beacon receiver 1040 may also measure and provide signal characteristics of the received wireless beacon signals to processor 1010. For example, receiver 1040 might store received signal levels or a more complex measure such as an RSSI (Received Signal Strength Indication) which might include a noise estimate. wireless beacon receiver 1040 may also be integrated with other wireless circuitry within wireless communications interface 1050

Wireless communications interface 1050 allows mobile device 1000 to communicate with a wireless network that is communicatively connected with management server complex 140 or radio management server 900. Wireless communication interface 1050 may be a Wi-Fi interface connecting mobile device 1000 to a local wireless LAN. Wireless communication interface 1050 may be a cellular interface connecting mobile device 1000 to the cellular network. Wireless communication interface 1050 may be a CBRS interface connecting mobile device 1000 to a local CBRS network. Those skilled in the art of wireless communications will understand that these examples are only exemplary and other options exist that would allow mobile device 1000 to efficiently communicate wirelessly with a network communicatively connected with management server 140 or radio management server 900.

Power supply 1060 supplies power for the active electronics in mobile device 1000. Typically mobile device 1000 would use batteries to provide power. In some cases, for example if mobile device 1000 was integrated into a larger assembly, such as a warehouse robot, power might be provided to the power supply from an external source.

Descriptions and particular examples are provided in this specification to enable one skilled in the art to understand the invention and are not meant to limit or circumscribe in any way the possible embodiments or implementations of this invention. The disclosure of aspects or elements of a particular embodiment are understood to not limit their use to only that embodiment; such disclosures may be applicable to some or all of the disclosed embodiments.

I claim:

1. A method of providing integrated activity detection and monitoring comprising:

storing by a management server, before an event, information comprising an association between a wireless beacon identified by a unique wireless beacon identifier with a camera;

detecting an event by a mobile device;

receiving by the mobile device RF energy from the wireless beacon;

decoding by the mobile device the unique wireless beacon identifier of the beacon from the received RF energy;

storing by the mobile device the decoded unique wireless beacon identifier of the wireless beacon and respective associated signal strength information;

reporting by the mobile device to the management server the event detected, stored identification information for at least one wireless beacon and respective associated signal strength information; and determining by the management server the camera associated with the wireless beacon based on the wireless beacon identifier reported by the mobile device correlating by the management server the reported beacon identification information with stored beacon location information;

computing by the management server using the beacon's respective associated signal strength information a reporting mobile device location; and determining by the management server at least one camera based on the reporting mobile device location;

computing by the management server using respective associated signal strength information at least one of a pan, tilt or zoom setting of the determined camera;

directing by the management server the camera to use said at least one computer pan, tilt, or zoom setting; and directing by the management server the storage of an image data stream from the determined camera in long-term storage.

2. A management server capable of providing integrated activity detection and monitoring comprising:

a memory storing configuration information comprising one or more unique beacon identifiers, each beacon associated respectively with at least one camera, wherein a camera may be associated with more than one beacon identifier;

a first network interface operable to communicate with a mobile device;

a second network interface operable to communicate with a camera management and image storage server;

a processor running software operable to:

receive information from the mobile device comprising at least an event notification, identification information for at least one wireless beacon and respective associated signal strength information;

correlate the reported beacon identification information with stored beacon location information;

compute using each beacon's respective associated signal strength information a reporting mobile device location;

determine at least one camera based on the reporting mobile device location;

compute using respective associated signal strength information at least one of a pan, tilt or zoom setting of the determined camera;

direct the camera to use said at least one computer pan, tilt, or zoom setting; and direct the storage of an image data stream from the determined camera in long-term storage.

* * * * *